Apr. 17, 1923.
W. H. BALDWIN
1,451,807
TRACTOR LAWN MOWER
Filed Nov. 12, 1919
2 Sheets-Sheet 1
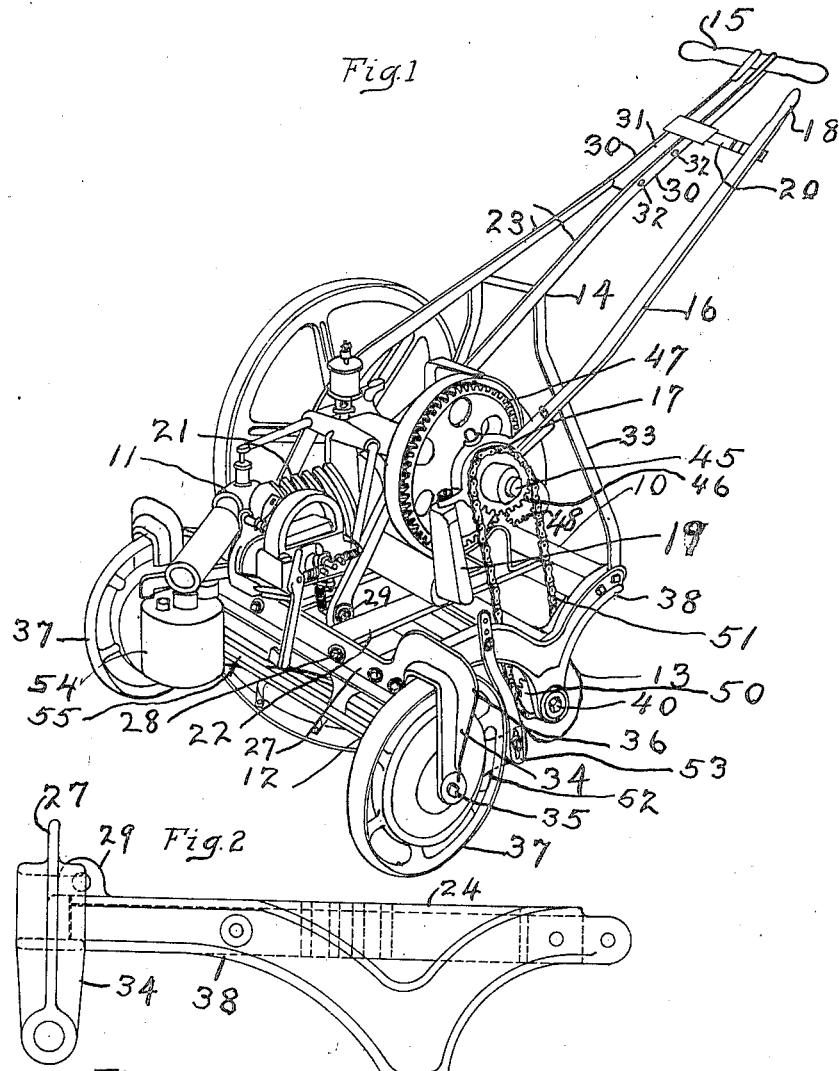
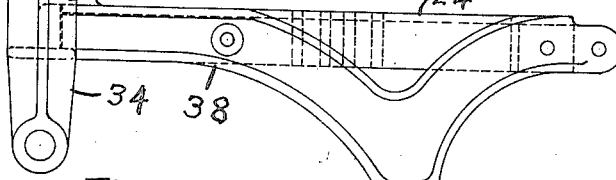
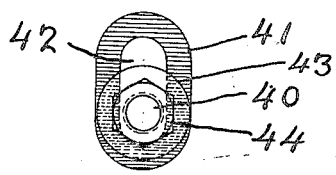
Inventor
William Hall Baldwin
By Louis N. Schmidt
Attorney Apr. 17, 1923.
W. H. BALDWIN
TRACTOR LAWN MOWER
Filed Nov. 12, 1919
1,451,807
2 Sheets-Sheet 2
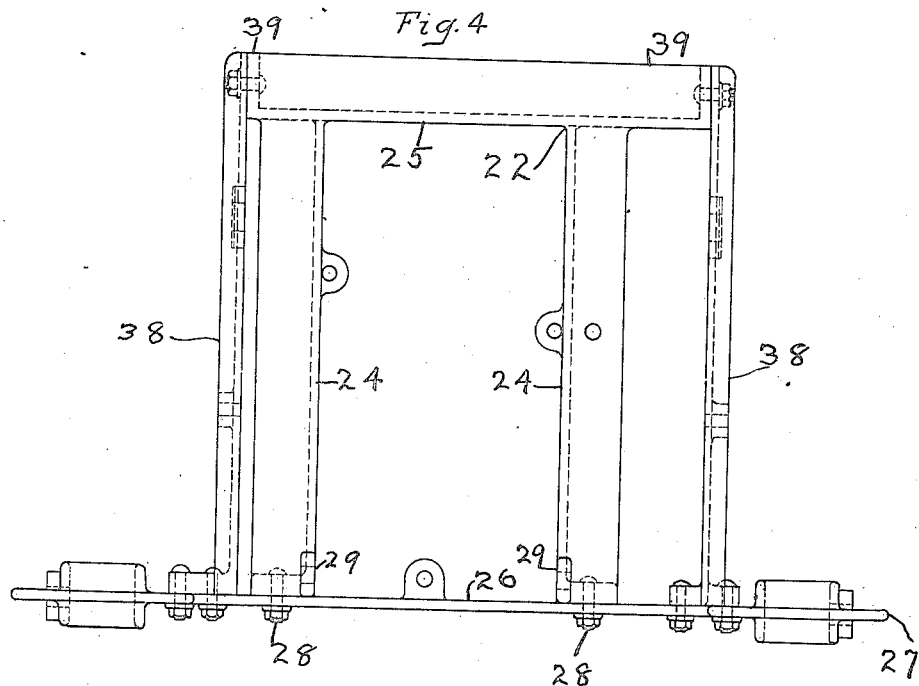
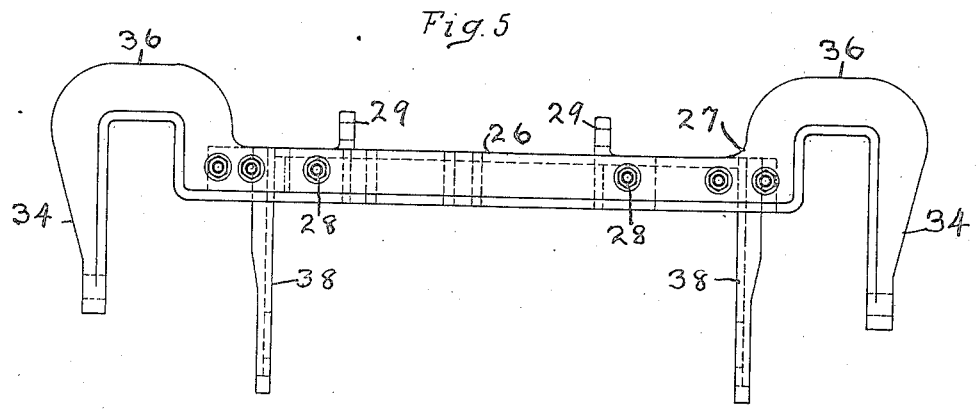

Patented Apr. 17, 1923.

1,451,807

UNITED STATES PATENT OFFICE.

WILLIAM HALL BALDWIN, OF MIDDLETOWN, CONNECTICUT.

TRACTOR LAWN MOWER.

Application filed November 12, 1919. Serial No. 337,385.

*To all whom it may concern:*

Be it known that I, WILLIAM HALL BALDWIN, a citizen of the United States, residing at Middletown, in the county of Middlesex and State of Connecticut, have invented certain new and useful Improvements in Tractor Lawn Mowers, of which the following is a specification.

My invention relates to improvements in tractor lawn mower combinations of the form in which a lawn mower is combined with a tractor device that is driven by an internal-combustion engine, and the object of my improvement is to produce a combination in which the direction or steering is by hand, the lawn mower portion being operated in substantially the same manner as in the ordinary hand driven lawn mower, and in which the parts are constructed and arranged, involving a proper distribution of the weights of the parts, so that a compact and correspondingly light structure will be operative to produce efficient and satisfactory results in cutting grass.

In the accompanying drawing:—

Figure 1 is a perspective view of my improved tractor lawn mower.

Figure 2 is a side elevation of the frame structure.

Figure 3 is a fragmentary view, in side elevation and on an enlarged scale, showing the cooperating parts for adjustably supporting the roller shaft from the frame.

Figure 4 is a plan view of the frame.

Figure 5 is an end elevation of the same, as viewed from the front end.

My improved tractor lawn mower combination comprises a frame 10 that supports an engine 11 on the upper side, has a lawn mower 12 operatively connected to the front end portion, has a tractor roll 13 positioned at the underside and at the rear of the lawn mower 12, which supports an upwardly and rearwardly directed handle frame 14 that is provided with a handle 15 at the rear end, has means for operatively supporting the clutch lever 16 for operating the clutch 17 and that extends also upwardly and rearwardly, adjacent the handle frame 14, and has the handle 18 at the rear end, and is provided with a post 19 for supporting the inner end of the said clutch lever 16.

The handle frame 14 supports a transversely directed, notched cross-arm 20 that has two notches for holding the clutch lever 16 in the two positions in which it is adapted to be set, the one for connecting the engine 11 with the tractor roll 13 and the other for disconnecting these parts.

The engine 11 comprises as one casting the single cylinder 21 and the other usual adjacent rigid and stationary parts, the said casting constituting the engine frame, and the said frame is supported by the engine bed portion 22 of the main frame 10 and held in place by suitable bolts.

The engine bed portion 22 is a flat table-like structure of skeleton form of cast material comprising a pair of parallel and longitudinally directed rails 24, positioned in spaced relation, cross connected at their rear ends by an integral cross bar 25, and cross connected at their front ends by the generally middle portion 26 of the front cross bar 27, being connected to the said front cross bar 27 by bolts 28.

The handle frame 14 comprises a pair of main handle members 23 that are connected by their front ends to lugs 29 on front end portion of the engine bed 22, which front ends are appreciably separated, and extend upwardly and rearwardly from the said front ends and converge suitably to have the rear end portions 30 closed against a filling piece 31 and secured thereto by bolts 32. The said filling piece 31 is the stem portion of a T-shaped handle structure and has the transversely directed handle proper 15 at the outer end. The general form of the main handle members is such as to extend over and to clear the engine structure 11 and they are provided with braces 33 that extend upwardly from the rear of the engine bed 22 and connect with the body portion, suitably to support and position the said handle frame members.

The front cross bar 27 is straight for the major portion that extends along the front edge of the engine bed 22, has at each end a vertically directed arm 34 that connects at its lower end with the shaft 35 of the lawn mower 12, and intermediate the said straight and major portion and the said arms 34 has a U-shaped portion 36 of suitable size to loop over and provide clearance for the wheels 37 of the lawn mower 12, thus permitting of depressing the height of the engine bed relatively to the upper sides of the said wheels 37.

The main frame 10 is completed by the two side plates 38, one on each side, connected by the front end to the straight portion 26 of the front cross bar 27 and connected at the rear to a lateral extension 39 of the rear cross bar 25, and which serves as the support for the shaft 40 of the tractor roll 13. The side plates 38 extend downwardly from the said ends in generally V-shape formation and have a slotted eye 41 at the apex for receiving the said shaft 40.

The slot 42 in the boss 41 is vertical and is provided for permitting of adjustment of the position of the shaft therein. The positioning of the shaft 40 is effected by means of a block 43 that has a hole that fits the shaft and is engaged with the outer face of the boss 41 and is held in place by a nut 44 screwed onto the end of the shaft 40, there being a block 43 and nut 44 at each end of the shaft. The opposed and cooperating faces of the boss 41 and the block 43 are ribbed or corrugated to facilitate holding in the positions to which they may be adjusted.

The tractor roll shaft 40 is stationary, the tractor roll 13 being operatively mounted thereon by means of ball bearing devices at the ends of the roll.

The clutch 17 is provided on the counter-shaft 45 and has a moving member that is slidably mounted on the said counter-shaft and is moved back and forth between the operative and the inoperative positions by the lever 16. A sprocket gear 46 on the end of the counter-shaft 45 is connected through the clutch 17 with the large gear 47 and the said large gear 47 is driven by the small gear 48 on the crank-shaft.

A sprocket gear 50 is incorporated in the structure of the tractor roll 13 and is connected with the sprocket gear 46 by the sprocket chain 51.

The trailer arm 52 that extends rearwardly from the shaft 35 of the lawn mower 12 and is the part of the lawn mower frame that usually supports a roll of wood and is changed in position to regulate the closeness of the cutting of the grass is rigidly and adjustably connected to the main frame 10 by an arm 53, the said roll being omitted.

The lawn mower 12 may be of the ordinary form, such as is used for hand operation and changed simply to the extent of omitting the ordinary handle, connecting the ends of the lawn mower shaft to arms 34 of the frame, and omitting the trailer roll and tying the trailer arm 52 to the frame 10, as by means of the tie arm 53, as has been described.

The lawn mower that I have found adapted to the particular structure described is of standard form, having a nineteen inch cutting blade, and having driving wheels that are ten inches in diameter, and the engine also of standard form is rated at one and one-half horse-power, and operating as an eight cycle internal-combustion engine.

These devices I have incorporated in an operative device involving the following structural details:—

The tractor roll 13 is of six and one-half inches in diameter, and sixteen inches in length; the distance between centers of the lawn mower shaft wheels and the tractor roll is twelve inches; the length of the handle from the front cross-bar is four feet; the engine bed extends rearwardly over the tractor roll, with clearance for adjustment; the total weight is two hundred and thirty pounds; and the weight is so distributed that the following conditions prevail:—

Bearing down on the handle so as to use the tractor roll as a fulcrum a pressure of twenty-seven pounds suffices to raise the lawn mower from the ground, stopping the cutting without stopping the engine.

Also, lifting on the handle so as to use the lawn mower wheels as a fulcrum a lifting pressure of forty-four pounds suffices to raise the tractor roll from the ground, stopping power propulsion without stopping the engine.

The gasolene tank 54 overhangs the front of the engine bed 22 and is immediately in front of and adjacent the front cross rod 55 that is part of the frame of the lawn mower 12, being virtually positioned between the wheels 37 of the lawn mower 12.

The engine is set upon the bed so that most of the weight, about two hundred pounds, rests upon the tractor roll, the relatively small weight on the lawn mower wheels being found to be sufficient to effect a proper operation of the lawn mower under normal conditions, involving preventing the lawn mower wheels from bounding from the ground and thereby losing the tractive or driving effect for operating the cutter blades.

The means of adjustment provided for the tractor roll relatively to the frame permits adjusting for unevenness of the bottom, tracting surface relatively to the bottoms of the lawn mower wheels that rest upon the ground as well as to adjust for tightening the sprocket chain 51.

I find that the distribution of the weight is important and critical, as, for instance, by setting the engine forward a fraction of an inch the operation is not satisfactory, the relatively short wheel base of twelve inches having an important bearing on this condition.

Furthermore, it is because of the short wheel base that I can dispense with the trailer roll for regulating the closeness of the grass cutting, as the tractor roll serves for this purpose.

As constructed and arranged the device is adapted for obtaining right action, can be easily directed by one man and tilted one way or the other to effect a change in operation or change in direction, can be turned on a short radius and is therefore adapted to operate for back and forth work and without leaving a balk in the cutting plot.

The roll is a unit, the entire roll surface operating to drive, and in order to make a sharp turn and prevent twisting the roll on the ground the roll is simply lifted from the ground.

These results, involved in a device in which the lawn mower operates substantially in the same manner as in a hand driven machine, I believe to be novel.

I claim as my invention:—

1. A tractor lawn mower combination comprising a frame, an engine supported by the said frame, a pair of lawn mower driving wheels supporting the front end portion of the said frame, a tractor roll supporting the rear end portion of the said frame, means for operatively connecting the two end portions of the said roll with the said frame, and the said means being provided with adjusting devices that are adapted to permit of adjusting the vertical relation of the said two end portions of the roll relatively to the frame, whereby the parts can be adjusted so that the part of the roll and the parts of the driving wheels that contact with the ground will be substantially in a common plane.

2. A tractor lawn mower combination comprising a frame, a motor supported by said frame, a tractor roll connected to said motor and supporting the rear end of said frame, a lawn mower device positioned at the front end of said frame, having a pair of driving wheels that serve to support said front end, having a trailer arm structure, and having a set of cutting blades that is supported by said trailer arm structure, and a connecting arm connected by one end to said trailer arm structure and by the other end to said frame and adapted to change the points of connection with the other parts.

3. In a tractor lawn mower structure comprising a frame, a motor supported thereby, a lawn mower structure proper connected to said frame and having a pair of driving wheels, and a tractor roll driven from said motor and connected to said frame, and a handle connected to said frame, said driving wheels being at the front end, said handle being extended rearwardly, and said roll being intermediate said handle and driving wheels, and said roll being positioned adjacent and relatively close to said lawn mower structure proper so as to facilitate steering under operating conditions by means of tilting movements effected through the medium of the handle.

WILLIAM HALL BALDWIN.